US005840098A

United States Patent [19]
Barbe et al.

[11] Patent Number: 5,840,098
[45] Date of Patent: Nov. 24, 1998

[54] MEMBRANE GENERATORS HAVING HIGH FLEXIBILITY

[75] Inventors: Christian Barbe, Fontenay aux Roses; Jean-Renaud Brugerolle, Paris; Guy Salzgeber, Bretonneux, all of France

[73] Assignee: L'Air Liquide, Societe Anonyme Pour L'Etude et L'Exploitation Des Procedes Georges Claude, Paris Cedex, France

[21] Appl. No.: 264,197

[22] Filed: Jun. 22, 1994

Related U.S. Application Data

[63] Continuation of Ser. No. 709,226, Jun. 3, 1991, abandoned.

[51] Int. Cl.$^6$ ............................. B01D 46/46; B01D 53/22
[52] U.S. Cl. ............................. 95/18; 96/8; 95/54
[58] Field of Search ................... 95/47, 48, 49, 95/50, 45, 54, 1, 23, 14, 17, 18; 364/172; 96/10, 8

[56] References Cited

U.S. PATENT DOCUMENTS

| | | | |
|---|---|---|---|
| 3,832,830 | 9/1974 | Gerow | 96/8 |
| 4,545,787 | 10/1985 | Hegarty | 60/39.02 |
| 4,560,394 | 12/1985 | McDonald et al. | 95/54 |
| 4,595,405 | 6/1986 | Acrawal et al. | 62/18 |
| 4,787,919 | 11/1988 | Campbell et al. | 55/16 |
| 4,806,132 | 2/1989 | Campbell | 95/12 |
| 4,902,422 | 2/1990 | Pinnau et al. | 210/500.23 |
| 4,954,144 | 9/1990 | Burgoyne et al. | 95/54 |
| 4,994,094 | 2/1991 | Behling et al. | 95/39 |
| 5,013,437 | 5/1991 | Trimmer et al. | 210/321.78 |
| 5,064,447 | 11/1991 | Lee | 55/16 |
| 5,102,432 | 4/1992 | Prasad | 55/16 |
| 5,108,465 | 4/1992 | Bauer et al. | 95/54 |
| 5,131,928 | 7/1992 | Blackman et al. | 55/16 |
| 5,131,929 | 7/1992 | Brockmann et al. | 55/16 |
| 5,425,801 | 6/1995 | Prasad | 95/15 |
| 5,470,379 | 11/1995 | Garrett | 96/4 |
| 5,516,359 | 5/1996 | Kang et al. | 95/14 |

FOREIGN PATENT DOCUMENTS 0 359 149  3/1990  European Pat. Off. .

OTHER PUBLICATIONS

Hydrocarbon Processing, vol. 64, No. 2, pp. 87–89, Feb., 1985, H. Yamashiro, et al., "Plant Uses Membrane Separation".

Primary Examiner—Reba I. Elmore
Assistant Examiner—Robert J. Dolan
Attorney, Agent, or Firm—Oblon, Spivak, McClelland, Maier & Neustadt, P.C.

[57] ABSTRACT

A process for operating a permeable membrane generator at above or below design conditions therefor, which entails adjusting the permeation temperature of a feed stream permeating said membrane generator by heating or cooling means, thereby providing a desired amount, purity and pressure of a product gas.

27 Claims, 8 Drawing Sheets

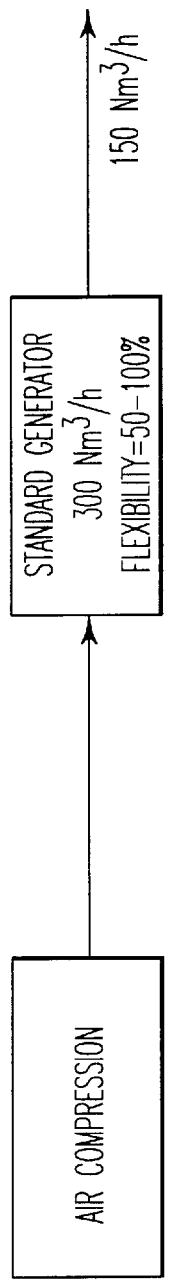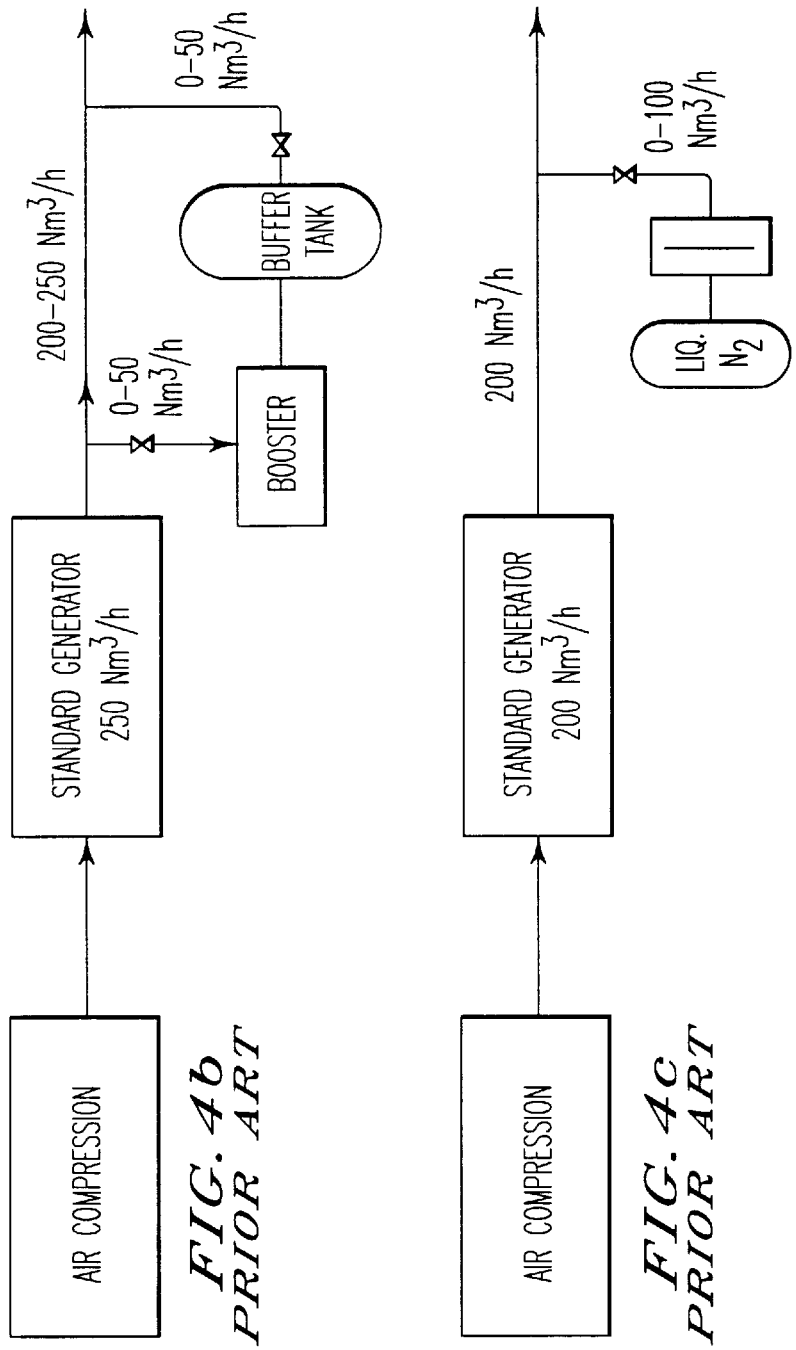
FIG. 4a PRIOR ART
FIG. 4b PRIOR ART
FIG. 4c PRIOR ART

MEMBRANE GENERATORS HAVING HIGH FLEXIBILITY

This application is a Continuation of application Ser. No. 07/709,226, filed on Jun. 3, 1991, now abandoned.

BACKGROUND OF THE INVENTION

1. Field of the Invention:

The present invention relates to a permeable membrane generator having high flexibility to meet evolving market demand.

2. Description of the Background:

Membrane processes are presently employed for a wide variety of gas separations. In such processes, a feed stream is brought into contact with the surface of the membrane wherein the more readily permeable component, such as oxygen in the case of air feed, is recovered at low pressure whereas the less readily permeable component, such as nitrogen in the case of air feed, is collected as a non-permeate stream at a pressure close to feed pressure.

The economics and inherent user friendliness of such gas separations have long been promoted particularly in the recovery of hydrogen in hydrogen-rich streams or the production of nitrogen from air.

However, experience has shown that there are several drawbacks associated with such gas separations. First, it is very difficult to appreciate, when designing the unit, the real average capacity which will eventually be required by the customer. Second, real world consumption profiles of gas, particularly nitrogen, are often unknown and difficult to predict accurately both by the supplier and even the end user. In general, flow-demand seems to fluctuate far more than often estimated. Third, customer needs or market demand can significantly evolve in time typically in the use of inert gases in batch processes. For example, the nitrogen requirement for the first year might entail providing nitrogen during one shift and in the second year it might entail providing nitrogen during two shifts.

These observations can lead to significant membrane generator design difficulties for the continuous supply of gas to a customer, and, therefore, limit the economic interest therefor as compared to other technologies such as cryogenics. This is particularly the case if the customer also has strict purity and delivery pressure specifications. It is important to understand that such flexibility constraints have essentially appeared with the arrival of non-cryogenic on-site technologies for producing and delivering gas to a customer. While conventional technology based on the storage of on-site liquefied gas with vaporization of the same on demand has the highest possible degree of flexibility for meeting the flow, purity and pressure requirements of the customer, it also has a high cost.

Conventionally, two methods have been proposed for overcoming the first and second problems described above.

The first solution entails designing a membrane generator with an average flow and providing gas product storage to level out the peak periods, and/or cryogenic liquid storage to guarantee continuous supply. However, product buffer tanks are usually limited to reducing small and short peak periods, and beyond the capacity of the buffer tank, it is necessary to vaporize backup liquid at considerable expense.

Alternatively, the second solution entails overdesigning the generator capacity and to provide a turndown control method for the membrane separation system. Many technologies have been invented to adjust the flow of the generator to customer demand including adjusting the area of membrane, adjusting partial pressure across the membrane, as described in U.S. Pat. No. 4,806,132, and increasing the level of purity to higher than specification. However, even if a system is designed which does not increase specific operating costs during turndown periods, the overdesign of the whole system is very expensive, and can render the overall membrane generator non-competitive.

Although the above two methods can provide a partial answer to the need for flexibility for the first and second problems described above, neither method provides a satisfying answer to the long term evolution of customer demand. These methods only entail the use of additional equipment at significantly increased expense.

Thus, considering the true demands of the market, the individual needs of customers and the limitations of conventional operations using membrane generators, a need continues to exist for a membrane generator having high flexibility in both design and operation so as to provide a desired flow, pressure and quality of gas at all times and at the lowest cost.

SUMMARY OF THE INVENTION

Accordingly, it is an object of the present invention to provide a process for designing and operating a permeable membrane generator at above and under design conditions so as to provide a desired flow, pressure and quality or purity of gas at all times and at the lowest cost.

It is also an object of the present invention to provide such a process by controlling the permeation temperature of a membrane generator.

It is, further, an object of the present invention to provide a process for avoiding condensation in a membrane of a membrane generator that could lead to performance degradation.

It is also an object of the present invention to provide apparati for practicing the above methods.

The above objects and other which will become apparent in view of the following disclosure are provided by a process for operating a permeable membrane generator at above or under design conditions therefor, which entails adjusting the permeation temperature of a feed stream permeating the membrane generator by heating or cooling means, thereby providing a desired amount, purity and pressure of a product gas.

BRIEF DESCRIPTION OF THE DRAWINGS

FIG. 4 illustrates three conventional alternatives for the design of a membrane generator, for a specified set of customer requirements:

a) a first alternative, including a large size membrane generator which uses standard turndown procedures to reduce energy consumption during off peak periods, b) a second alternative, including an intermediate size membrane generator in association with a large buffer tank and an optional booster compressor to store nitrogen at higher pressure and for release during peak periods, and c) a third alternative, including a standard membrane generator in association with a liquid nitrogen storage tank for vaporization during peak periods.

Figure 5:
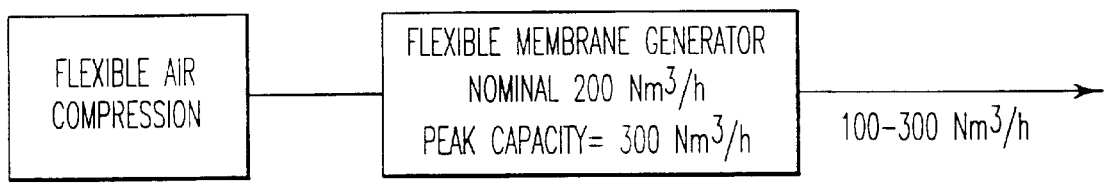

FIG. 5 illustrates a highly flexible membrane generator in accordance with the present invention.

Figure 6:
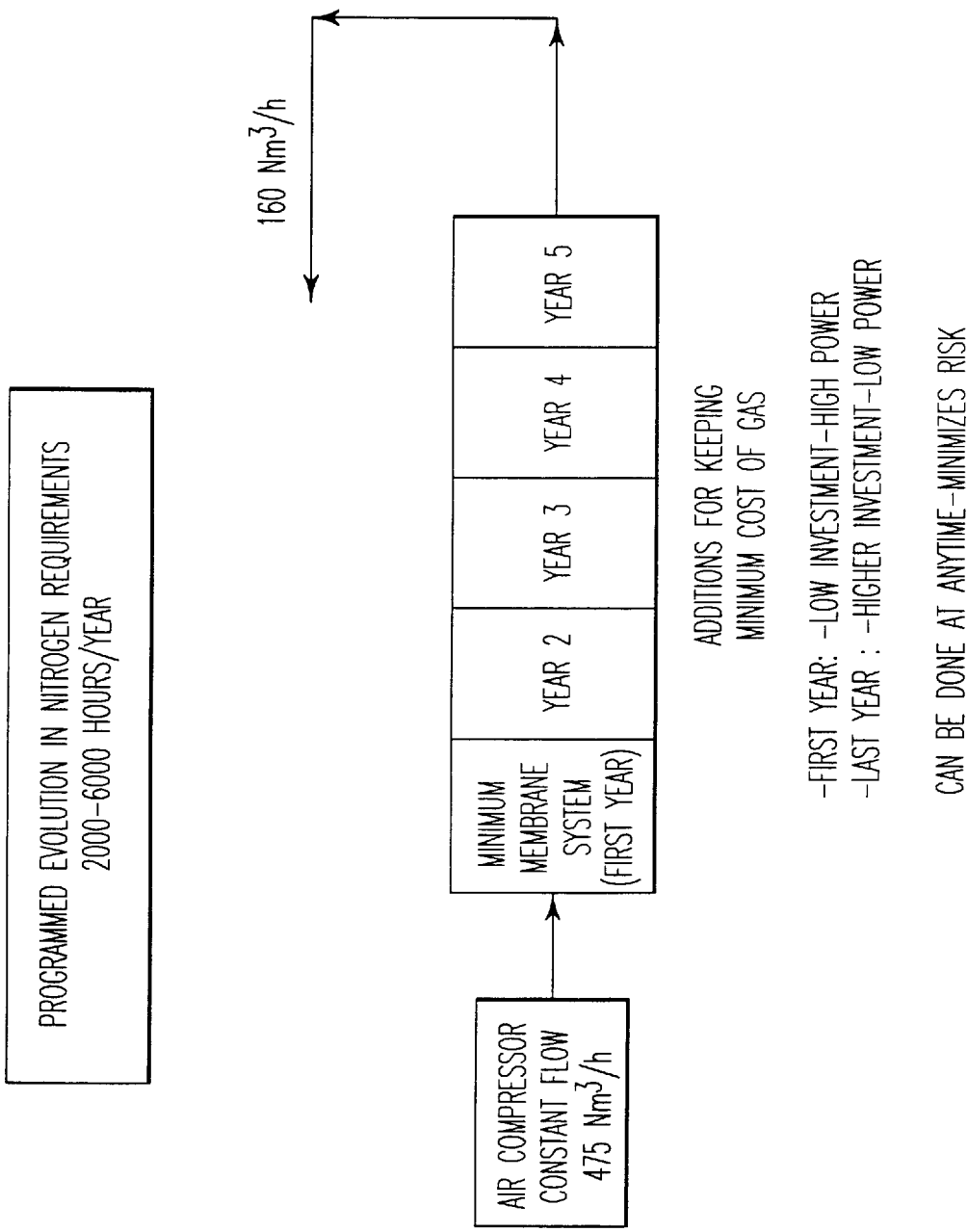

FIG. 6 illustrates the addition of membranes in succeeding years to a membrane system to meet changing customer consumption profiles in accordance with the present invention.

Figure 7:
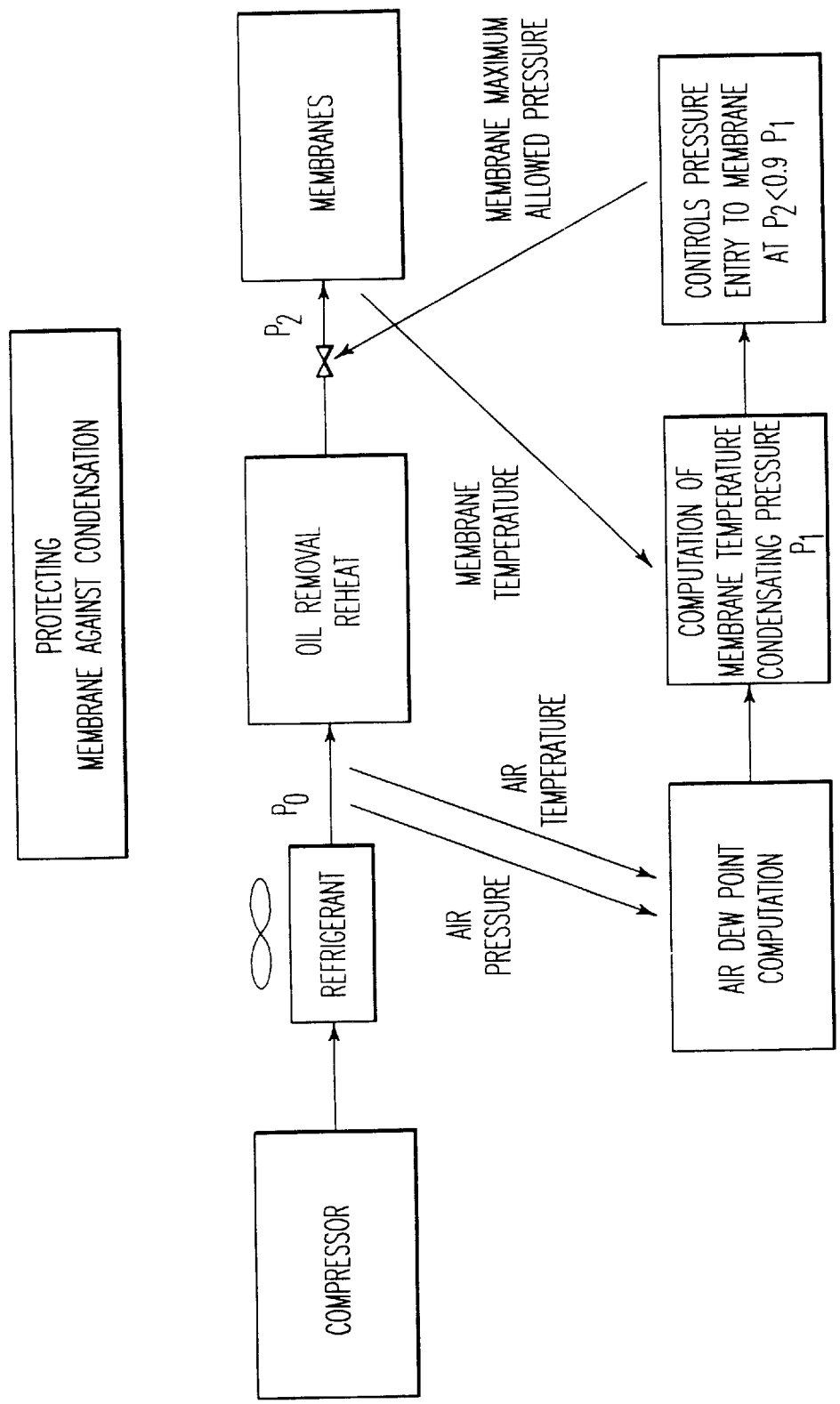

FIG. 7 illustrates a means for protecting membranes against condensation in accordance with the present invention.

FIG. 8 illustrates several features of the present invention:

a) illustrates the increase in membrane productivity for certain membranes with increasing temperature, b) illustrates that in addition to the increase in productivity described in a), little or no loss in recovery is observed, and c) illustrates the loss of membrane performance with time as a function of operating temperature.

DETAILED DESCRIPTION OF THE PREFERRED EMBODIMENTS

In accordance with the present invention, a method is provided for designing and operating a permeable membrane generator at above and under design conditions by controlling permeation temperature. The membrane generator may be used, if desired, in association with changes in permeation pressure and/or with a product buffer tank.

Generally, the present invention provides a permeable membrane generator which is adjustable by means of a demand signal indicating that off design conditions are required. The "off design conditions" may be either those which represent an increase (plus) or a decrease (minus) relative to design conditions. Further, the "demand signal" means may be any means capable of indicating that off design conditions are required.

For example, the demand signal means may be a product flow measurement or a product purity input or a pressure measurement or any switch positioned manually or automatically to a different than design position.

The membrane system of the present generator is then designed to incorporate any analogic or numeric control system, such as a process computer, which is programmed to adjust the temperature of the feed gas or the permeation bundle either by heating or cooling the same.

Additionally, in accordance with the membrane generator described above, other modifications may also be used such as changing the pressure of the feed gas or using a buffer tank.

The present invention also provides a method for avoiding membrane condensation which could lead to performance degradation, with or without partial destruction of the membrane itself, by controlling permeation temperature and possibly feed pressure.

Figure 1:
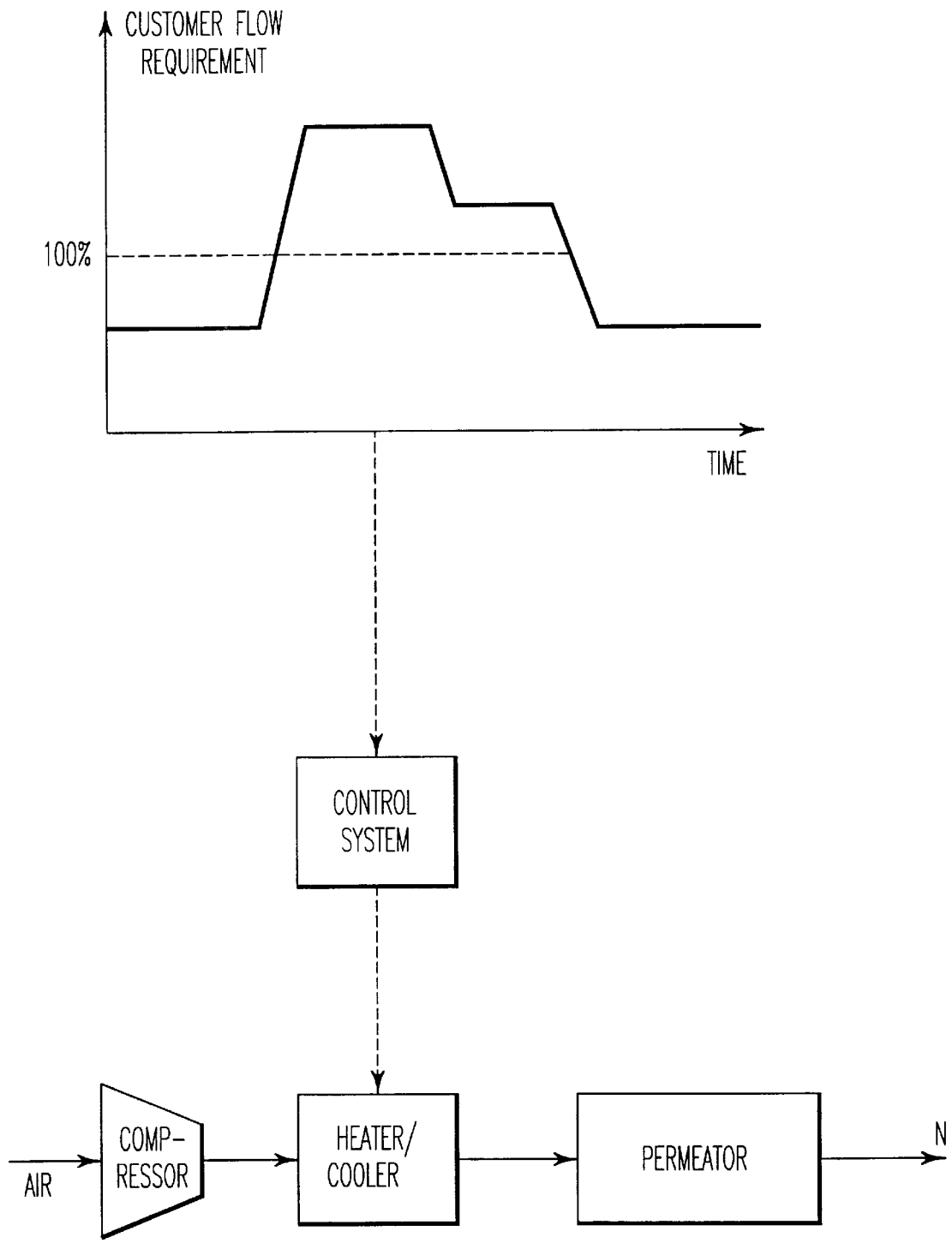
FIG. 1 illustrates the present control process in which permeation temperature is adjusted to provide a desired amount, quality or purity and pressure of product gas as required by a customer.

The present invention is generally accomplished by employing a control method in which upon increased or reduced demand, the permeation temperature, optionally in association with the other previously described solutions, such as modifying the permeation feed pressure or using a buffer tank, is adjusted to provide the right amount, quality or purity and pressure of gas required by the customer. This is generally illustrated in FIG. 1.

In accordance with the present invention, adjustments in permeation temperature may be effected either by heating or cooling the permeator directly, or by heating or cooling the feed stream prior to feeding the same to the permeator. The heating or cooling, in either case, may be effected by conventional heating or cooling means.

The present invention is particularly advantageous when using certain membranes, such as polysulfone, polyimide and polyamide membranes, for example, that have the capability of operating in a wide range of temperature. In accordance with the present invention, it is preferred that the membranes be capable of operating in a temperature range of $-20°$ C. to $90°$ C., and desirable that they are capable of operating in the temperature range of about $20°$ C. to $60°$ C.

It is preferred, moreover, that the membranes be capable of exhibiting an increase in productivity with increasing operating temperature, while preferably maintaining a stable, or only a limited decrease in recovery. Such capability is particularly desirable in the temperature range of about $20°$ C. to $60°$ C. For example, most polyimides meet these requirements. Preferably, the membranes used are hollow fiber membranes.

However, polymeric membranes are known to lose or suffer diminished performance with time. This aging factor can be more or less important depending on the type of polymer used and the operating conditions, such as feed pressure, permeate back pressure, pressure cycling, and resistance to pollutants and the temperature of operation.

Therefore, membrane generators are usually not designed for steady state operation at high temperature so as not to degrade membrane performance, and necessitate module replacement or add on, too rapidly. Hence, by using the present invention, i.e. controlling and applying the modified permeation temperature to fit the customer requirement for gas, not only is the proper amount of gas supplied at optimum cost, but membrane capital is preserved to the greatest extent possible by avoiding excessive temperatures at other than peak periods.

Conventionally, steady temperature increases have only been used to compensate for aging phenomena in membrane generators for hydrogen purification for the very different purpose of maintaining static separation capacity in time or for maintaining a constant rate of recovery at varying feed gas flow rates or pressures, which is particularly important in the recovery of hydrogen in feed streams, as disclosed in EP-A-60693 and EP-A-75431. By contrast, the present invention provides a means for matching dynamic customer needs for gas, particularly nitrogen, by controlling permeation temperature, optionally in conjunction with other means.

The present invention provides several advantages, for the production of nitrogen from air or from feed stream mixtures containing mainly nitrogen and oxygen. The invention can also be used for oxygen content control and/or $CO_2$ content control in a feed mixture comprising essentially nitrogen.

Generally, in operating the permeable membrane generator at above or below design conditions therefor, in accordance with the present invention, the present process further entails operating the membrane at a pressure below the condensation pressure of the feed stream on the membrane.

First, in accordance with the present invention, it is possible to adjust the nominal flow, once the membrane generator has been designed and manufactured, while maintaining a constant air flow supply by a compressor.

Second, in accordance with the present invention, it is possible to match or meet high and long peak periods and to improve the fit on any other type of fluctuation.

Third, in accordance with the present invention, it is possible to match or meet long-term and evolving customer needs by adjusting the permeation temperature as a low investment upgrade.

Fourth, in accordance with the present invention, it is possible to protect membranes against any condensation that could degrade their performance without excessively compromising generator performance.

FIG. 1 graphically illustrates, at the top of the figure, the variance of customer flow requirement with time. It also illustrates, at the bottom of the Figure, the use of a control system to modify the output of the membrane generator to meet off design conditions.

In FIG. 1, the control system is used to activate a heater or a cooler to either heat or cool the feed stream prior to entering the permeator. The feed stream is fed to the heater or cooler from a compressor. However, the heater or cooler may be used to directly heat or cool the permeator itself in order to achieve the same effect.

Figure 2:
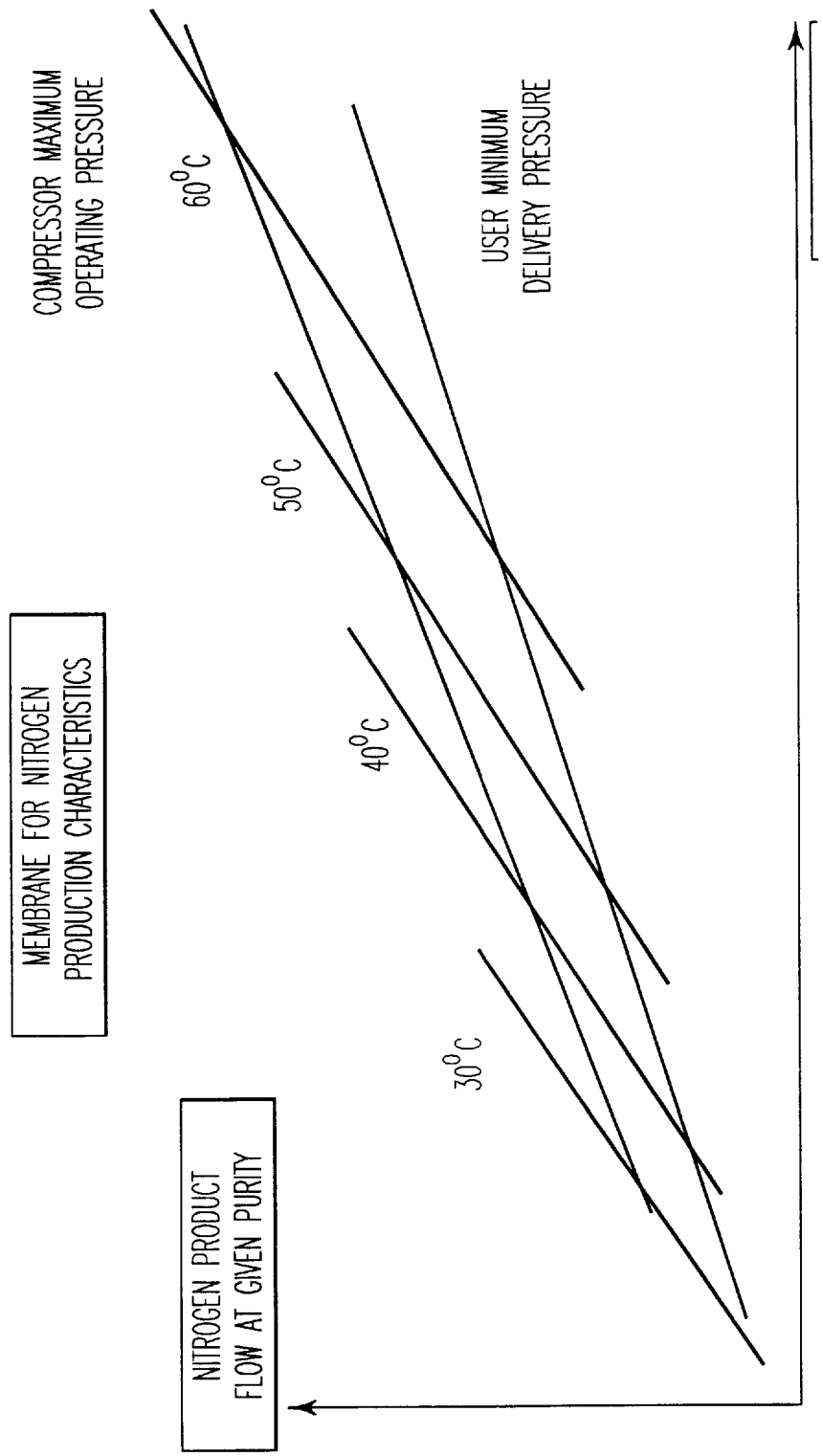
FIG. 2 illustrates the production of nitrogen from air using a membrane having the characteristics shown in accordance with the present process, and having a large range of operating conditions.

FIG. 2 illustrates the characteristics of a membrane used for nitrogen production, and that it is feasible for a given membrane area, at a given purity, in accordance with the present invention, to adjust the nominal flow of product nitrogen from a membrane to a considerable extent while using a given capacity of the compressor. This may be accomplished by simultaneously modifying set points of air temperature or temperature and pressure to the membrane. Moreover, it is also possible when using a flexible air source, such as a flexible compressor to enlarge the adjustment of the nominal flow, by varying inlet air flow in combination with temperature and pressure set points adjustment.

Figure 3:
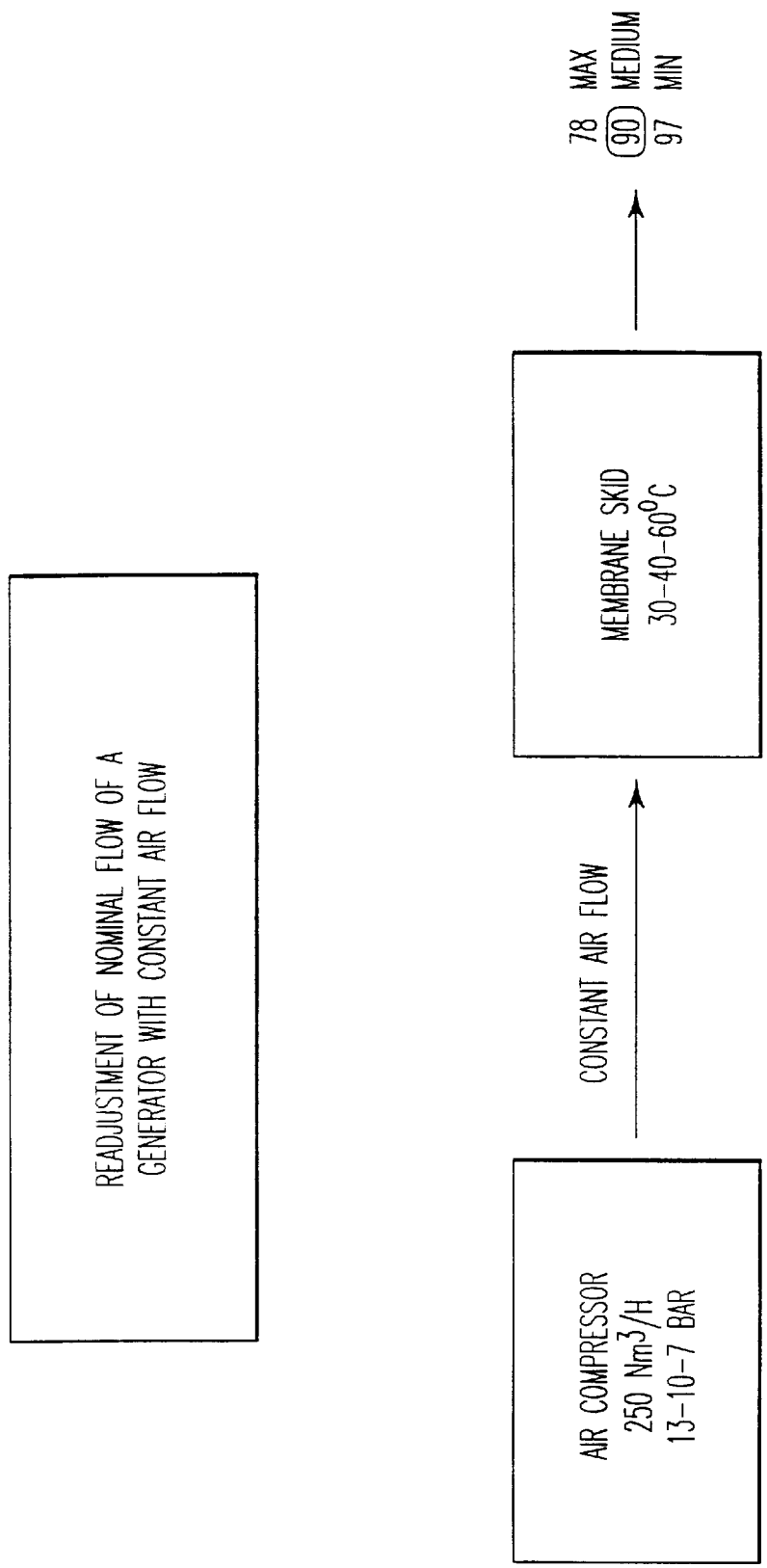
FIG. 3 illustrates the readjustment of nominal flow of a generator with constant air flow in accordance with the present invention.

FIG. 3 illustrates a specific application of the general principle illustrated in FIG. 2. In particular, FIG. 3 illustrates the use of an air compressor which is designed to deliver 250 Nm$^3$/h of constant air flow at 7, 10 or 13 bars of pressure, and the adjustment of nominal generator flow in accordance with the present invention. This is explained in more detail in Example 1.

FIGS. 4(a), 4(b) and 4(c) illustrate three conventional alternatives for the design of a membrane generator, the choice of which depends upon customer requirements. FIG. 4(a) illustrates the use of a standard air compressor and a large standard generator designed to produce 300 Nm$^3$/hr of nitrogen. With a flexibility of 50–100%, the generator can be made to produce from 150–300 Nm$^3$/hr of nitrogen. Standard turn down procedures are used to reduce energy consumption during off peak periods. However, even if the specific operating costs do not increase during turndown periods, the fact that the whole system is overdesigned is likely to render the same non-competitive.

FIG. 4(b) illustrates a second conventional alternative using a standard air compressor and an intermediate size membrane generator designed to produce 250 Nm$^3$/h of nitrogen in association with a large buffer tank and an extra booster compressor to store nitrogen at high pressure and for release during peak periods. However, this conventional alternative is limited by the fact that product buffer tanks are usually limited to reducing small and short peak periods. Beyond the capacity of the buffer tank, it is necessary to vaporize backup liquid at considerable expense.

FIG. 4(c) illustrates a third conventional alternative using a standard air compressor and a smaller size membrane generator designed to produce 200 Nm$^3$/h of nitrogen in association with cryogenic liquid storage to guarantee continuous product supply. However, this conventional alternative is quite expensive as it is necessary to liquify and store product gas.

FIG. 5 illustrates the flexible membrane generator of the present invention. This figure illustrates the use of a flexible air compressor, i.e., one with an adjustable flow, and a flexible membrane generator having a nominal production of 200 Nm$^3$/h of product, and a peak production of 300 Nm$^3$/h of product. In using this system, the product output flow can be modified to between 100–300 Nm$^3$/h to afford high flexibility in responding to evolving customer flow requirements.

FIG. 6 illustrates the addition of membranes in succeeding years to a minimum membrane system to meet changing consumption profiles in accordance with the present invention. This figure illustrates a start up with n permeators operating at high temperature and pressure, with the addition of n new permeators the second year, operating at a slightly lower pressure and temperature to decrease the operating costs. In accordance with this aspect of the present invention, once the customer reaches the maximum annual requirement and desires to minimize operating costs, the membrane generator that is then installed is well adapted for the new consumption profile with a large number of permeators operating at low pressure and temperature.

FIG. 7 illustrates a means of protecting a membrane against condensation in accordance with the present invention. This figure specifically illustrates the control of operating temperature, optionally in conjunction with pressure control if needed, to reduce safety coefficients to the minimum necessary in order to protect the membrane.

In particular, after the feed stream is refrigerated, an air dew point computation is made. Then, after inputting membrane temperature, the membrane temperature condensating pressure P1 is computed. This controls the pressure at the entry to the membrane by providing a maximum allowable pressure P2 at the entry to the membrane.

Figure 8A:
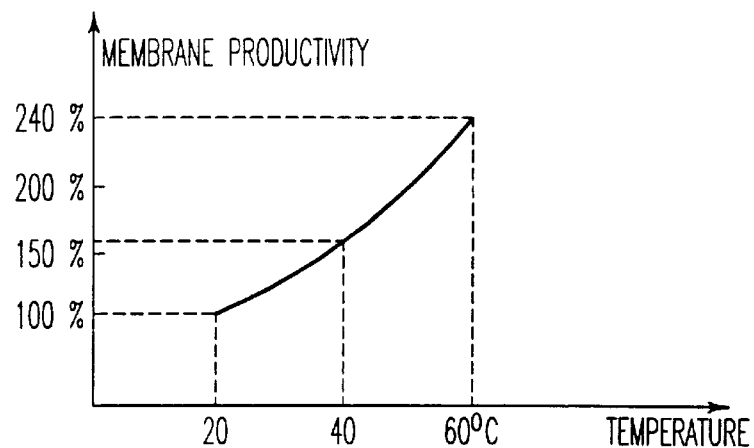

FIG. 8(a) illustrates that for certain membranes, such as polyimides, exhibit an increase in membrane productivity with an increase in temperature. For example, membrane productivity increases from 100% to 240% by elevating temperature from 20° C. to 60° C.

Figure 8B:
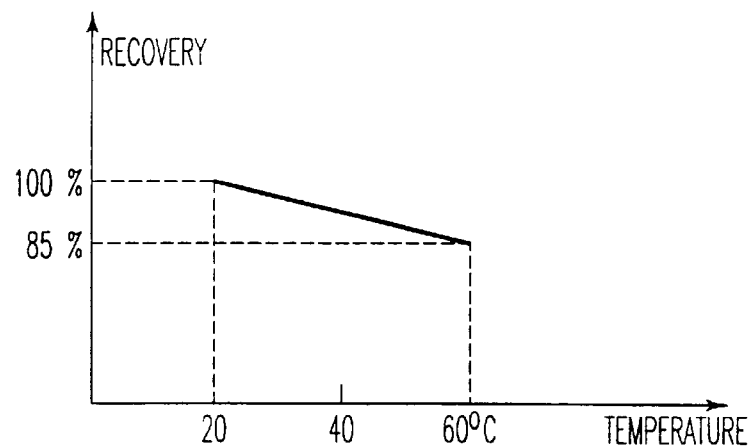

FIG. 8(b) illustrates that in addition to the increase in productivity, little or no loss in recovery occurs. For example, upon increasing the temperature from 20° C. to 60° C., a loss in recovery of from 100% to 85% is observed.

Figure 8C:
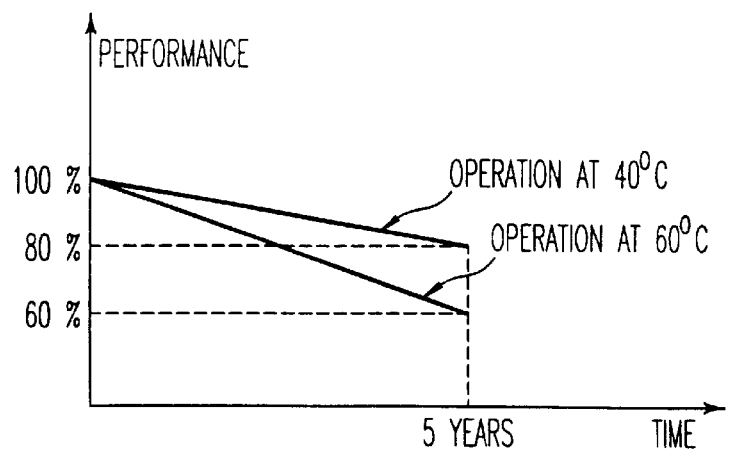

FIG. 8(c) illustrates the loss of membrane performance with time as a function of operating temperature. For example, in operating the membrane generator at 40° C. for five years, performance decreases from 100% to 80%. By contrast, in operating the membrane generator at 60° C. for five years, performance decreases from 100% to 60%.

In accordance with the present invention standard air compressors and flexible air compressors may be used which are readily available in commerce, and well known to those skilled in the art. Further, the use of a buffer capacity to store compressed air between the compressor and the membrane is also well known to the artisan. When the pressure in the buffer is "high", the compressor stops. When the pressure in the buffer is "low", the compressor starts.

The present invention also provides various apparati for practicing the above-described methods.

In one aspect, an apparatus is provided for operating a permeable membrane generator at above or below design conditions therefor, which entails:

a) compressor means having feed stream inlet means, b) a membrane permeator fluidly connected to said compressor means and being downstream thereof, c) heating or cooling means for heating or cooling said feed stream upstream of said permeator, or for heating or cooling said permeator, and d) control means for activating said heating or cooling means, to modify membrane generator output to meet off design conditions, which is activated by and responsive to demand signal means.

In the above-described apparatus, the stream from the compressor means, typically an air stream, is fed to a permeator. The stream may either be heated or cooled, as needed, in response to control means, activated by demand signal means, to modify the output of the membrane generator to meet off design conditions. The heating or cooling of the stream from the compressor may be effected either by heating or cooling the stream upstream of the permeator by using a heater or cooler upstream of the permeator, or by heating or cooling the permeator, itself.

As noted above, the present apparatus includes control means which is programmed to adjust the temperature of the feed gas or the permeator either by heating or cooling the same. The control means may be any analogic or numeric control system.

The demand signal means, as noted above, may be any means capable of indicating that off design conditions are required. For example, the demand signal means may be a product flow measurement or a product purity input or a pressure measurement or any switch positioned manually or automatically to a different than design position. Such demand signal means are well known to those skilled in the art and are readily available in commerce.

In another aspect, an apparatus is provided for readjusting nominal flow of a generator with constant air flow which entails:

a) compressor means having feed stream inlet means, b) a membrane skid fluidly connected to and downstream of the compressor means, and c) means for modifying set points of the stream temperature and pressure from the compressor means at constant air flow to the membrane skid, whereby said apparatus is capable of adjusting nominal generator flow while using full compressor means capacity.

In accordance with this aspect of the present invention, conventional means may be used to modify set points of feed stream temperature and pressure to the membrane skid.

The present invention also includes an apparatus as described above, however, wherein a flexible air compressor is used to provide a much larger degree of adjustment.

In another aspect, the present invention provides an apparatus for operating a permeable membrane generator at above or below design conditions therefor, which entails:

a) flexible compressor means having feed stream inlet means, and b) a flexible membrane generator fluidly connected to and downstream of the flexible compressor means.

In yet another aspect, the present invention provides an apparatus for protecting membranes from condensation, which entails:

a) compressor means having feed stream inlet means, b) refrigeration means fluidly connected to and downstream of the compressor means, c) means for computing feed stream dew point fluidly connected to and downstream of the refrigeration means, d) means for computing membrane temperature condensating pressure, P1, fluidly connected to and downstream of said means for computing feed stream dew point, e) means for controlling entry pressure, P2, to one or more membranes, the one or more membranes being fluidly connected to and downstream of the refrigeration means, such that the following relationship is satisfied:

P2<0.9 P1.

In accordance with the present invention, control means may be used and computing means which are well known to those skilled in the art. Additionally, conventional compressor means, both standard and flexible, and refrigeration means may be used. These are well known to the artisan.

Also, in accordance with the present invention, conventional means may be used for computing the membrane temperature condensating pressure, P1, and for controlling entry pressure, P2, to the one or more membranes.

Further, the feed stream of the present invention will generally be either air and/or mixtures containing mainly oxygen and nitrogen. Thus, the feed stream inlet means described hereinabove may be any conventional inlet means for air and/or mixtures containing mainly oxygen and nitrogen.

Thus, the present invention generally addresses the problem arising from having a substantially constant nitrogen concentration in the feed stream, while having a variable demand of the permeate or non-permeate.

The present invention will now be further illustrated by reference to certain examples which are provided solely for purposes of illustration and are not intended to be limitative.

The following examples consider the production of inert gas containing essentially nitrogen, from air based on the application of membranes having the characteristics described in FIG. 2.

EXAMPLE 1

READJUSTMENT OF NOMINAL FLOW OF A GENERATOR WITH CONSTANT AIR FLOW

Having manufactured a membrane skid for the production of 90 Nm$^3$/h of nitrogen with an air compressor capable of delivering 250 Nm$^3$/h of compressed air at 10 bars, it is possible by the present invention to adjust at any time, if necessary, the nominal flow of the nitrogen from 78 Nm$^3$/h (−13%) to 97 Nm$^3$h (+8%) while still using the full capacity of the compressor. This is achieved by modifying simultaneously set points of air temperature and pressure to the membrane skid:

| 78 Nm$^3$/h | temp.: 60°C. | press.: 7 bar |
| 90 Nm$^3$/h | temp.: 40°C. | press.: 10 bar |
| 97 Nm$^3$/h | temp.: 20°C. | press.: 13 bar |

Further, a much larger degree of adjustment can be achieved if a sufficient flexibility is available on the air pressure supply. The range indicated in the above example is only exemplary and is typical of what can be achieved using standard oil lubricated screw compressors, for example. This specific example is illustrated in FIG. 3.

EXAMPLE 2

CREATING HIGH FLEXIBILITY INTO A MEMBRANE GENERATOR

Consider a customer with a nitrogen consumption profile as described hereunder:

average flow 200 Nm³/h
one peak of 6 hours per day at 300 Nm³/h
5 days per week operation
total flow per month 108000 Nm³
pressure supply requirement 12 bar To design a satisfactory membrane generator for such a customer, either of the three following conventional alternatives are presently available.

First, a large membrane generator may be installed having a capacity of 300 Nm³/h and standard turndown procedures may be applied to reduce energy consumption during off peak periods. However, even if the operating performance is not degraded during the off peak periods, the unit is, nevertheless, overdesigned about 75% of the time. This is particularly true for the membrane area, which is an important part of the cost.

Second, an intermediate size membrane generator having a capacity of 250 Nm³/h may be installed in association with a large buffer tank (e.g. 30 m³) and an extra booster compressor to store nitrogen at a higher pressure for release during peak periods. However, this approach requires added investment and the cost of operation usually renders the approach uncompetitive.

Third, a standard generator may be installed to cover average flow, and which has installed therewith a liquid nitrogen storage tank for the vaporization of necessary liquid during peak periods. However, since the cost of liquid nitrogen will, in this approach, be far greater than the cost of the gas produced by the generator, the cost to the customer will be increased by 10 to 20%.

However, by applying the present invention described above, and as shown in FIG. 5, a highly flexible membrane generator is provided. By increasing the temperature from 40° C. (design) to 60° C. during the 6 hour peak period per day, it is possible to increase the productivity of the membrane generator by 50%.

Thus, in accordance with the present invention, it is sufficient to install a unit of 200 Nm³/h for covering the average flow while operating at 40° C. and to boost the operating temperature of 60° C. during each peak period so as to produce the required 300 Nm³/h of $N_2$. It is, of course, necessary to supply an increased air flow and/or pressure to the membrane generator in approximately the same proportion. Those skilled in the art of engineering will appreciate that many technological solutions exist to satisfy the increased air demand and that it is standard practice to design such equipment, such as initial overdesign of air compressor, variable speed compressor, multiple compressors in parallel, internal recycle valves and suction valves, for example.

In the case of reduced capacity requirement, such as 100% to 70%), conventional turndown methods have included reducing pressure differential across the membrane and/or reducing the membrane area and/or on/off operation and/or increasing purity.

It is explicitly within the scope of the present invention to practice such a turndown method by adjusting preferentially the permeation temperature. This is typically from 40° C. to 30° C. In association with on/off operation of the compressor and/or an air buffer tank, this affords a very high degree of flexibility for turndown compared to conventional practices, such as those described above, for example, while still maintaining the membrane under steady state operation and delivering constant pressure and purity to the customer.

Those skilled in the art will also appreciate the advantage of such an invention in matching at optimal cost the nitrogen demand of a customer by supplying the right flow, purity and pressure of gas required at any time with minimal liquid nitrogen vaporization.

EXAMPLE 3

MATCHING PROGRAMMED EVOLUTION IN NITROGEN REQUIREMENTS

The volume of nitrogen required by a customer is often directly linked in many applications to the volume of business of that customer. In such a case, the need for nitrogen is to be seen not only on the basis of the flow required at the start of the unit, but also on a 3 to 5 year basis.

Conventionally, a unit would be designed either under start up conditions with installation of supplementary units as the customer's needs evolve. However, this approach suffers from two major drawbacks. First, the cost of the gas produced will not benefit from any scale effect, such as multiplication of small and less performant units, and the flexibility of such a system for interim periods is low.

Also, units have been conventionally overdesigned from the beginning. However, the customer then benefits from the low operation costs of the gas but the necessary investment and the associated industrial risk are high, particularly if linked to new markets or businesses for which the development schedule can be difficult to appreciate.

By contrast, the present invention enables a matched programmed evolution in customer nitrogen requirements, while minimizing industrial risk and keeping maximum flexibility to evolving demand.

Consider a customer whose estimated volumes of nitrogen are:

| | |
|---|---|
| first year: | 160 m³/h for 2000 h/year |
| second year: | 160 m³/h for 3000 h/year |
| third year: | 160 m³/h for 4000 h/year |

Considering the low load rate of the unit during the first years, the cost of the gas will be particularly sensitive to initial investment, and much less sensitive to the operation cost such as energy. Therefore, by adjusting the temperature operation set point associated with the area of membrane installed as the year demand increases, it is possible to start up the unit with a minimum investment.

Typically, and as shown in FIG. 6, the unit may be started up with n permeators operating at high temperature and pressure, while adding n new permeators in the second year and using slightly lowered operating pressures and temperatures, thus decreasing the operating costs, for example. Once the customer reaches the maximum annual requirement (e.g. 160 m³/h for 6000 h/year) and is particularly concerned with minimizing operating costs, the membrane generator that is then installed on site is well adapted for the new customer consumption profile with a large number of permeators operating at low pressure and temperature (−25% on specific energy compared to start up conditions).

The benefit this system can bring to both the customer and the gas supplier by matching nitrogen requirements, minimizing investment and risk at start up while maintaining benefit from scale effect on the medium/long term and permanently optimizing the compromise between operating cost and fixed cost may be readily appreciated by those skilled in the art.

EXAMPLE 4

PROTECTING MEMBRANES AGAINST CONDENSATION

The sensitivity of membrane performance to any condensation on the surface of the polymer is understood by those skilled in the art. Therefore, designs of membrane generators usually incorporate safety coefficients in terms of air pressure and temperature so as to avoid any risk of condensation in a very large range of atmospheric conditions.

This procedure can lead to significant overestimation of necessary safety coefficients during 95% of the time and thus penalize membranes competitiveness versus other technologies. FIG. 7 illustrates that in accordance with the present invention, operating temperature (possibly associated with pressure) may be controlled, which enables the reduction of safety coefficients only to a level which is strictly necessary for the protection of the membrane. The competitiveness of membrane generators is thus surprisingly increased.

Thus, the present invention generally addresses the problem which arises from a substantially constant nitrogen concentration in a feed stream of air and/or gas mixtures containing mainly oxygen and nitrogen, but with a variable demand either for the non-permeate or permeate.

Having described the present invention, it will be apparent to one of ordinary skill in the art that many changes and modifications may be made without departing from the spirit and the scope of the present invention.

What is claimed as new and desired to be secured by Letters Patent of the United States is:

1. A process for adjusting a nominal flow of product nitrogen gas from a membrane skid, which comprises adjusting a set point of a compressed feed stream temperature to said skid, said compressed feed stream being air or a mixture containing mainly nitrogen and oxygen, said adjusted nominal flow of nitrogen being obtained from a constant flow supply, and wherein compressor output is not reduced during said process.

2. The process of claim 1, which further comprises adjusting a set point of compressed feed stream pressure to said skid.

3. The process of claim 1, wherein said adjustment of said nominal flow from said skid is effected without reducing compresser output.

4. The process of claim 1, which further comprises adjusting feed stream pressure prior to permeation through said skid.

5. The process of claim 1, wherein said compressed air feed stream is compressed by compressor means producing a feed stream of about 7 to 13 bar pressure, said membrane skid operating at a permeation temperature of about 30° C. to 60° C.

6. A process for readjusting nominal flow of a nitrogen membrane generator capable of matching dynamic customer need for nitrogen with constant flow, which comprises:

a) providing a feed stream to compressor means, the compressor means being fluidly connected to a membrane skid at constant air flow, and b) adjusting said nominal generator flow by modifying set points of a steam temperature and pressure from said compressor means to said membrane skid, wherein said feed stream has a constant flow supply and further wherein compressor output is not reduced during said process.

7. The process of claim 6, wherein said set points of temperature and pressure are modified by set point modifying means at constant flow to the membrane skid, whereby nominal generator flow is adjusted while using full compressor capacity.

8. The process of claim 7, wherein said feed stream is air or a mixture containing mainly oxygen and nitrogen.

9. An apparatus for operating a permeable membrane generator at above or below design conditions therefor, which comprises:

a) flexible compressor means having feed stream inlet means, and b) a flexible membrane generator fluidly connected to and downstream of the flexible compressor means, whereby a compressed feed stream is passed through the flexible membrane generator in constant flow supply and further wherein compressor output is not reduced during operation of said apparatus.

10. The apparatus of claim 9, wherein said flexible membrane generator comprises one or more membranes each being capable of exhibiting increasing productivity with increasing operating temperature.

11. The apparatus of claim 10, wherein said one or more membranes are used at a temperature in the range of −20° C. to 90° C.

12. An apparatus for operating a permeable membrane generator at above or below design conditions therefor, which comprises:

a) compressor means having feed stream inlet means, b) a membrane permeator fluidly connected to said compressor means and being downstream thereof, c) heating or cooling means for heating or cooling said feed stream upstream of said permeator, or for heating or cooling said permeator, and d) control means for activating said heating or cooling means, to modify membrane generator output to meet off design conditions, said control means being responsive to demand signal means, whereby a compressed feed stream is passed through said membrane permeator in a constant flow supply and further wherein compressor output is not reduced during operation of said apparatus.

13. The apparatus of claim 12, wherein said control means is an analogic or numeric control system.

14. The apparatus of claim 12, wherein said demand signal means comprises product flow measurement means, product purity input means, pressure measurement means or switching means positioned manually or automatically to a different than design position.

15. An apparatus for readjusting nominal flow of a generator with constant air flow, which comprises:

a) compressor means having feed stream inlet means, b) a membrane skid fluidly connected to and downstream of the compressor means, and c) means for modifying set points of the stream temperature and pressure from the compressor means at constant air flow to the membrane skid, whereby the apparatus is capable of adjusting nominal generator flow while using full compressor capacity, whereby a compressed feed stream is passed through said membrane skid in constant flow supply and further wherein compressor output is not reduced during operation of said apparatus.

16. A process for producing a variable nominal flow rate of nitrogen using a nitrogen membrane generator having hollow fiber membranes whereby variable need for nitrogen at above or below design conditions therefor is satisfied, which comprises:

a) adjusting permeation temperature of a compressed feed stream permeating said membrane generator by heating or cooling means in order to obtain an amount, purity and pressure of product nitrogen gas obtained;

b) passing said temperature-adjusted compressed feed stream through said hollow fiber membranes, whereby oxygen-enriched air is obtained as a permeate and nitrogen is obtained as a non-permeate; and c) recovering the amount, purity and pressure of product nitrogen gas determined by step a), wherein said compressed feed stream passed through said hollow fiber membrane has a constant flow supply and further wherein said compressor output is not reduced during said process.

17. The process of claim 16, wherein said compressed feed stream is maintained at a constant feed stream flow supply by compressor means.

18. The process of claim 16, wherein said permeation temperature is adjusted by adjusting the temperature of the feed stream to the permeator.

19. The process of claim 16, wherein said permeation temperature is adjusted by adjusting the temperature of the permeator.

20. The process of claim 16, wherein said temperature is adjusted by heating or cooling means, which are activated by control means.

21. The process of claim 16, further comprising the step of operating the membrane at a pressure below the condensation pressure of the feed stream on the membrane.

22. The process of claim 16, wherein the membrane is a hollow fiber membrane.

23. The process of claim 16, wherein said compressed feed stream is air or a gas mixture consisting mainly of nitrogen and oxygen.

24. The process of claim 16, wherein said membrane contains one or more membranes selected from the group consisting of polysulfone, polyimide and polyamide membranes.

25. The process of claim 24, wherein said membranes are capable of exhibiting an increase in productivity with increasing operating temperature, while exhibiting a stable, or only a limited decrease in recovery in the temperature range of 20° C. to 60° C.

26. A process for operating a nitrogen membrane generator having hollow fiber membranes and being capable of meeting dynamic need for nitrogen at above or below design conditions therefor, which comprises:

a) providing a compressed feed stream of air or a mixture containing mainly oxygen and nitrogen from compressing means having variable output capacity being fluidly connected to a nitrogen membrane generator having variable output capacity, wherein a permeation temperature of said compressed air feed stream permeating said nitrogen membrane generator is adjusted by heating or cooling means;

b) passing said compressed stream to said nitrogen membrane generator having hollow fiber membranes and having variable output capacity; and c) permeating said compressed feed steam through said hollow fiber membranes of said nitrogen membrane generator having variable output capacity at a temperature sufficient to effect operation of said generator at above or below said design conditions, whereby oxygen-enriched air is obtained as a permeate and nitrogen is obtained as a non-permeate, wherein said compressed feed stream passed to said nitrogen membrane generator having hollow fiber membrane has a constant flow supply and further wherein compressor output is not reduced during said process.

27. The process of claim 26, wherein said permeate leaves said membrane generator with a flow of about 100 to 300 $Nm^3/h$.

* * * * *